United States Patent [19]
Ferguson

[11] Patent Number: 5,933,826
[45] Date of Patent: Aug. 3, 1999

[54] METHOD AND APPARATUS FOR SECURING AND STORING EXECUTABLE CONTENT

[75] Inventor: Daniel T. Ferguson, Orom, Utah

[73] Assignee: Novell, Inc., Orem, Utah

[21] Appl. No.: 08/822,116

[22] Filed: Mar. 21, 1997

[51] Int. Cl.[6] .................................................. H04L 12/28
[52] U.S. Cl. .................. 707/9; 395/187.01; 395/188.01; 707/9; 711/163; 711/164
[58] Field of Search ............... 395/186, 187.01, 395/188.01; 707/9; 711/163, 164; 380/4

[56] References Cited

U.S. PATENT DOCUMENTS

| | | | |
|---|---|---|---|
| 5,701,458 | 12/1997 | Bsaibes et al. | 707/9 |
| 5,742,759 | 4/1998 | Nessett et al. | 395/187.01 |
| 5,758,344 | 5/1998 | Prasad et al. | 707/10 |
| 5,784,560 | 7/1998 | Kingdon | 395/200.31 |
| 5,832,209 | 11/1998 | Krantz | 395/187.01 |

OTHER PUBLICATIONS

Novell's Guide to NetWare 4.1 Networks, table of contents and Chapters 3, 6, 12 and 13, Hughes and Thomas, ISBN: 1–56884–736–X, 1996.

*Primary Examiner*—Ly V. Hua
*Attorney, Agent, or Firm*—Dinsmore & Shohl LLP

[57] ABSTRACT

Computer system for storing and securing executable content is disclosed. A plurality of interconnected nodes access the distributed directory. The distributed directory has a hierarchy of objects each having one or more associated attributes. An access control mechanism is operative to control access to the distributed directory. A target object within the distributed directory has a target attribute, wherein access to a target object is controlled by the access control mechanism. A program is stored as a value in the target attribute, such that access to the program is controlled by the access control mechanism.

23 Claims, 5 Drawing Sheets

METHOD AND APPARATUS FOR SECURING AND STORING EXECUTABLE CONTENT

TECHNICAL FIELD

The present invention relates generally to securing executable content, and will be specifically disclosed in connection with limiting access to executable content using the security structure of a distributed directory.

BACKGROUND OF THE INVENTION

The virtual explosion of technical advances in microelectronics, digital computers and software have changed the face of modem society. In fact, these technological advances have become so important and pervasive that some people refer to this explosion as "the information revolution." Through telephone lines, networks, satellite communications and the like, information is ever increasingly being accessed and shared. While increased interconnectivity is a desirable and powerful utilization of the technological explosion, it also poses a challenge with respect to security. This is particularly true when measured against the ever increasing ability and creativity of saboteurs, hackers and agents attempting to access sensitive information.

One type of information that is desirable to remain secure contains executable content in the form of programs. In general terms, a program is a sequential set of instructions from a programming language for directing a processor to perform specified operations or functions. Within the broad meaning of program, there are several types of programs. Three of the more common types of programs are object code, pseudo code and scripts. Object code is in a binary form which can be directly recognized and used by the processor to perform the intended functions of the program. In other words, object code is in machine language which can be directly understood by a processor. Usually, object code is generated by a compiler from source code. Source code is a higher level language which can be readily understood and written by humans. Examples of source code languages include C, C++, Java, Basic, Fortran, Pascal, etc. The compiler is responsible for compiling (i.e., translating the source code) into the low level object code understandable by the machine. Because of the differences between the various types of processors and operating systems, object code is generally machine specific. In other words, object code designed to run on an INTEL microprocessor will most likely not be able to run on a MOTOROLA microprocessor.

Pseudo code, which is sometimes referred to as byte code, is an intermediate type of program between source code and object code. Typically, pseudo code is produced by compilers from source code, however, the compiler does not completely translate the source code to the final machine language form. Pseudo code is executable, but requires an interpreter that, in effect, performs the last translation from the pseudo code to an executable machine language form. Pseudo code is in a binary form that indicates to the interpreter which function it should perform. One benefit of pseudo code is that, unlike object code, it is machine independent. The interpreter, which is machine dependent, is responsible for completing the compilation and translating the pseudo code into a form understandable by the machine.

Scripts, which are usually in the form of text files, are a series of uncompiled commands and functions written in a programming language that are interpreted at the time of execution to perform the intended function or service. Sometimes, a script is referred to as source code. A script, however, is not a series of automated commands that would otherwise be entered manually, such as a batch file or a login script (the of "script" is a misnomer). Scripts are often referred to as pure interpreted languages because a script cannot be executed without the aid of an interpreter. Generally, an interpreter is started and directed to read the script. As the interpreter executes the script, the interpreter uses commands and functions in the script to control or direct its execution. In other words, the interpreter has no purpose or reason to run unless something tells it what to do. In effect, at the time of execution the interpreter performs both translations: from source code to pseudo code, then either translating the pseudo code to executable machine language code or performing the same function itself that the object code would have had it made the final translation. Some examples of script languages include PERL, Visual Basic Script, AWK, Born Shell, Korn Shell, C Shell, REXX, and the like. In the NOVELL INTRANETWARE ENVIRONMENT, the.bas (Basic or NetBasic) scripts are common. The interpreter used to run or execute the script determines the type of script file. In other words, if PERL is running the script, the script is considered to be a PERL script and the contents of script must conform to the syntax and language implementation dictated by the PERL environment.

Often it is desirable to limit access to a given program to prevent the unauthorized access and execution of such programs. Traditionally, file system security provides security on a directory or file level. In other words, files or directories can be assigned a certain kind of access. Some common examples are execute, read, write, create, erase, etc. Nevertheless, file system security can be circumvented by a knowledgeable hacker, particularly in a distributed environment, thus leaving sensitive programs potentially vulnerable. This vulnerability is especially dangerous with scripts, since such programs can be easily edited or manipulated to perform unauthorized tasked for the intruder. For instance, a script file could be modified to illicitly give the intruder high level access rights to the entire system.

SUMMARY OF THE INVENTION

Accordingly, an object of the invention is to improve the security for programs, particularly in distributed systems. Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims.

One aspect of the present invention is a computer system. A plurality of interconnected nodes access a distributed directory. The distributed directory has a hierarchy of objects each having one or more associated attributes. An access control mechanism is operative to control access to the objects and information in the distributed directory. A target object in the distributed directory has a target attribute, preferably of a stream-type syntax, wherein access to the target object and the target attribute are controlled by the access control mechanism. A program, such as a script, pseudo code, or object code, is stored as a value in the target attribute such that access to the program is controlled by the access control mechanism.

Another aspect of the present invention is a method for storing a program in a computer system. A distributed directory is accessed having a hierarchy of objects with associated attributes and an access control mechanism for controlling access to at least a portion of the distributed directory. A target object having a target attribute is identified in the distributed directory. A program, such as a script, pseudo code or object code, is accessed and stored as a value in the target attribute. The access control mechanism prevents access to the value whereby the program cannot be executed unless access has been permitted by the access control mechanism. Optionally, during the step of storing the program as a value, the program can be encrypted such that it cannot be used unless it is first decrypted.

Still other aspects of the present invention will become apparent to those skilled in the art from the following description of a preferred embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

Reference will now be made to the present preferred embodiment of the invention, an example of which is illustrated in the accompanying drawings, wherein like numerals indicate the same element throughout the views.

DETAILED DESCRIPTION

Often computers telecommunicate between each other and share information, applications and/or services. Sometimes in this setting, the various computers are referred to as nodes, which is a generic term referring to a point in a interconnected system. One type of computer network employs a client/server architecture, wherein the portions of network applications that interact with human users are typically separated from the portions of network applications that process requests and information. Often, the portions of an application that interact with users or access network resources are called client applications or client software, and the portions of an application that process requests and information are called server applications or server software. Client machines tend to run client software and server machines tend to run server software, however a server can be a client as well.

Figure 1:
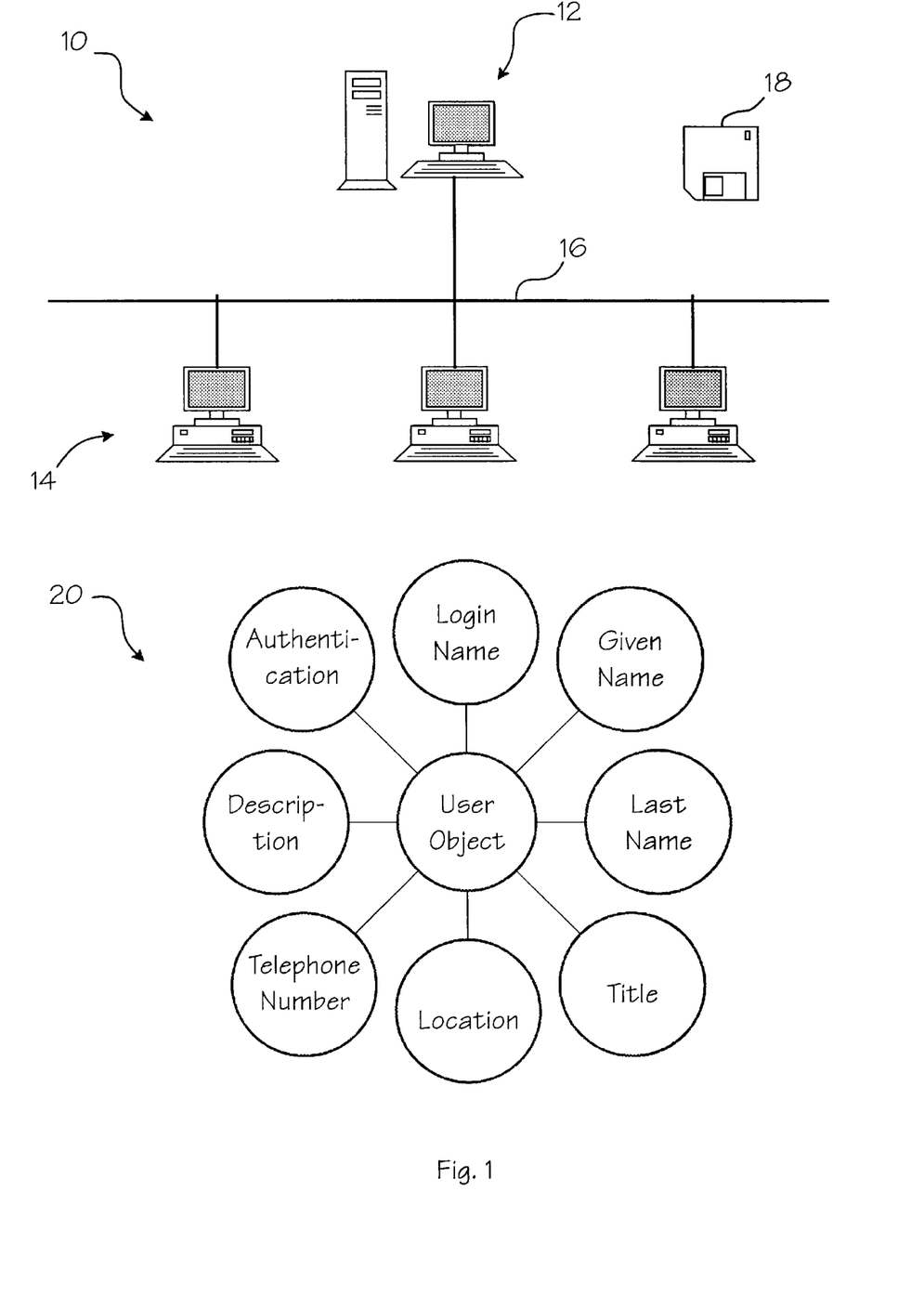
FIG. 1 depicts an example of interconnected nodes, a computer readable medium, and an object with several associated attributes.

FIG. 1 illustrates a sample client/server network 10. As one with ordinary skill in the art will readily appreciate, a client/server network is only one type of network, and a variety of other configurations, such as peer-to-peer connections, are also considered computer networks. In a client/server network, a plurality of nodes are interconnected such that the various nodes send and/or receive information to/from one another. As shown here, a server node 12 is interconnected to a plurality of client nodes 14 using a connection 16 such as a token ring, Ethernet, telephone modem connection, radio or microwave connection, or the like.

A computer readable medium 18, shown here as a floppy diskette, holds information readable by a computer, such as programs, data, files, etc. As one with ordinary skill in the art will readily appreciate, computer readable medium can take a variety of forms, including magnetic storage (such as hard disk drives, floppy diskettes, etc.), optical storage (such as laser discs, compact discs, etc.), electronic storage (such as random access memory "RAM", read only memory "ROM", programmable read only memory "PROM", etc.), and the like. Some types of computer readable medium, which are sometimes described as being nonvolatile, can retain data in the absence of power so that the information is available when power is restored.

The Distributed Directory

One mechanism to maintain and access information across a network of interconnected nodes is a synchronized hierarchial database called a distributed directory, such as NOVELL DIRECTORY SERVICES ("NDS"), which is based on the X.500 network services protocol developed and published by the CCITT and Open Systems Interconnection Consortium. The distributed directory is a database in the sense that information is stored as opposed to the traditional definition under Codd and Date. Usually in the context of a client/server network, a distributed directory spans and is shared by multiple networking server nodes, although a single server node can also maintain a distributed directory. While distributed directories are often used with client/server networks, they are not necessarily limited to the context of such networks. Information on the distributed directory can be created, read, modified, and shared by other nodes, such as client nodes or other server nodes, who have applicable access rights to the distributed directory.

The distributed directory contains a collection of objects, sometimes referred to as identities, with associated attributes or properties. For example, the object 20 is a user object that represents a human user. The object 20 has a variety of associated attributes, such as "Given Name", "Last Name", "Title", etc. Each associated attribute has a value, however, sometimes values are not associated with an attribute. For example, the value for the property "Given Name" might be "George". Beyond representing users, objects in the distributed directory represent things that humans relate to when dealing with computers. For instance, some typical objects might represent printers, print queues, files, resources, computers, and the like. In addition, objects can represent non-computer related things such as countries, companies, organizations, departments, buildings, and the like. Furthermore, objects can be organizational in nature to group other objects together. As one with ordinary skill in the art will readily appreciate, objects can represent virtually anything, whether imaginary or real.

Typically, the structure of the distributed directory is governed by a schema. The schema defines the rules for adding and managing objects and attributes of objects in the distributed directory. These rules are specified through a data dictionary that provides a standard set of data types from which objects can be created. Each object in the distributed directory belongs to an object class that specifies what attributes can be associated with the object. All attributes are based on a set of attribute types with the types of data which can be entered as values being dictated by the attribute syntaxes. The schema controls not only the structure of the individual objects, but also the relationship among the objects in the distributed directory. In controlling this relationship, the schema specifies subordination among object classes. That is, for every object there is a group of object classes from which subordinate objects can be formed. Objects that can contain other objects are called container objects, which are the building blocks of the distributed directory. Objects that cannot contain other objects are known as non-container or leaf objects.

Figure 2:
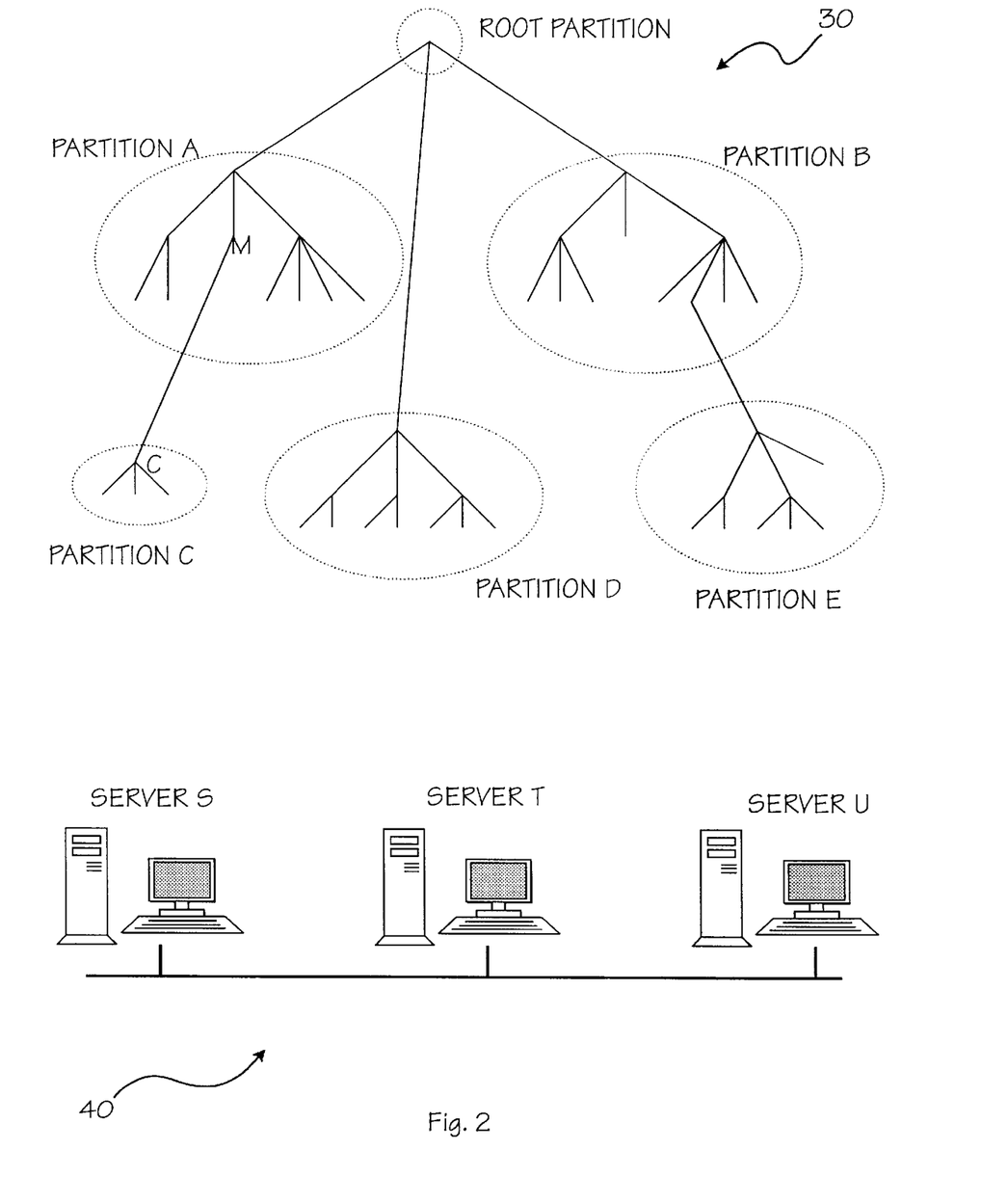
FIG. 2 depicts an example of a distributed directory and several servers accessing the distributed directory.

As shown in FIG. 2, the objects within the distributed directory 30 are viewed by a user in a hierarchial structure, generally in the form of a tree, where the branching points and leaves represent the objects. This hierarchy, objects closer to the root are superior or parents to objects further from the root, which are considered subordinate or children. For instance, the object M is the parent of the child object C. The distributed directory 30 is additionally organized in partitions, as illustrated by the dashed ellipses, with each partition comprising a plurality of objects organized as a logical subtree. Like objects, partitions closer to the root of the distributed directory 30 are called parent partitions to those further from the root, which are called child partitions. Each partition takes the name of the root object of the subtree. For instance, the root object of Partition C is the object C.

Multiple replicas of the partitions are stored across the network 40, wherein each insular server node holds a unique set of partitions and therefore a unique set of objects within that insular node. For instance, the following table demonstrates a sample partition organization:

|  | Root | Partition A | Partition B | Partition C | Partition D | Partition E |
| --- | --- | --- | --- | --- | --- | --- |
| Server S | Master | — | Master | Master | Read Only | Master |
| Server T | Read Only | Master | Secondary | — | Master | — |
| Server U | — | Read Only | Secondary | — | Read Only | Secondary |

As suggested by this table, there are three basic kinds of replicas. With a Read Only replica, clients can read entries from this replica, but cannot change entries. Each partition can have zero or more Read Only replicas. With a Secondary replica, clients can read, write, create and destroy entries in the distributed directory by accessing this replica. Each partition has zero or more Secondary replicas. A Master replica acts like a Secondary replica, but clients can additionally make structural changes by accessing the master replica, such as splitting and combining partitions, or creating and removing replicas. Each partition has exactly one Master replica.

In addition to the three types of replicas illustrated in the table, a fourth kind of partition, called subordinate references, are also used to coordinate partitions between a plurality of nodes. A subordinate reference does not store a replica of its partition data. Rather, it is a skeleton: it stores only attributes to the partitions root most object. Whenever a server holds a complete replica (i.e. Master, Secondary or Read Only) of a partition, but not a directly subordinate partition, it keeps a subordinate reference of the subordinate partition. Referring to FIG. 2 and the table, Server T holds a subordinate reference for Partition C (since it keeps a replica of Partition A) and Partition E (since it keeps a replica of Partition B). Server T ends up with a replica of each partition when subordinate references are included. Likewise, Server U holds a subordinate reference for Partition C (since it keeps a replica of Partition A). But Server U does not hold a replica of each partition: the Root Partition is absent. With subordinate references, a server can walk up and down the name tree across partition boundaries.

The distributed directory is a loosely synchronized database. An update made at one replica does not appear instantaneously at the other replicas. As such, it is possible that when an attribute value has been updated recently, a client could get a different result when reading attributes from different servers. A replication system is used to replicate or synchronize different objects changes in the distribute directory throughout the other servers accessing the distributed directory. One way of achieving this replication or synchronization is using the partition as a unit of data replication. An update made at one replica propagates to other replicas over time. Once the update ceases, the replicas converge to identical values. The server keeps a time stamp for each value of each attribute of each entry, identifying when and where that value was last modified. Since there can be competing updates at different replicas, the time stamps are used to determine which update is later. Doing so ensures that whenever multiple servers receive competing updates, each server with get the same result.

When a change is made locally to an entry in the distributed directory, a process in the server wakes up to propagate the change to all the replicas of the partition. Preferably, there is a brief time delay to allow a cluster of updates to be propagated in one session. This propagation proceeds one replica at a time through the replica list of a partition. After a server successfully sends all pending updates to one replica (or if the operation fails), it goes on to the next replica until all replicas have been updated. Replicas not updated in one round of the synchronization process are rescheduled for a later synchronization cycle. Also, obituaries keep track of information pending transmission to other servers. Obituaries are attribute values not visible to clients, but are used in server-server exchanges. Since obituaries are attribute values, they are synchronized using the same mechanism as the updates and are replicated across the distributed directory. The replication system of a distributed directory provides a highly reliable mechanism to transmit data between interconnected nodes.

Security

Figure 3:
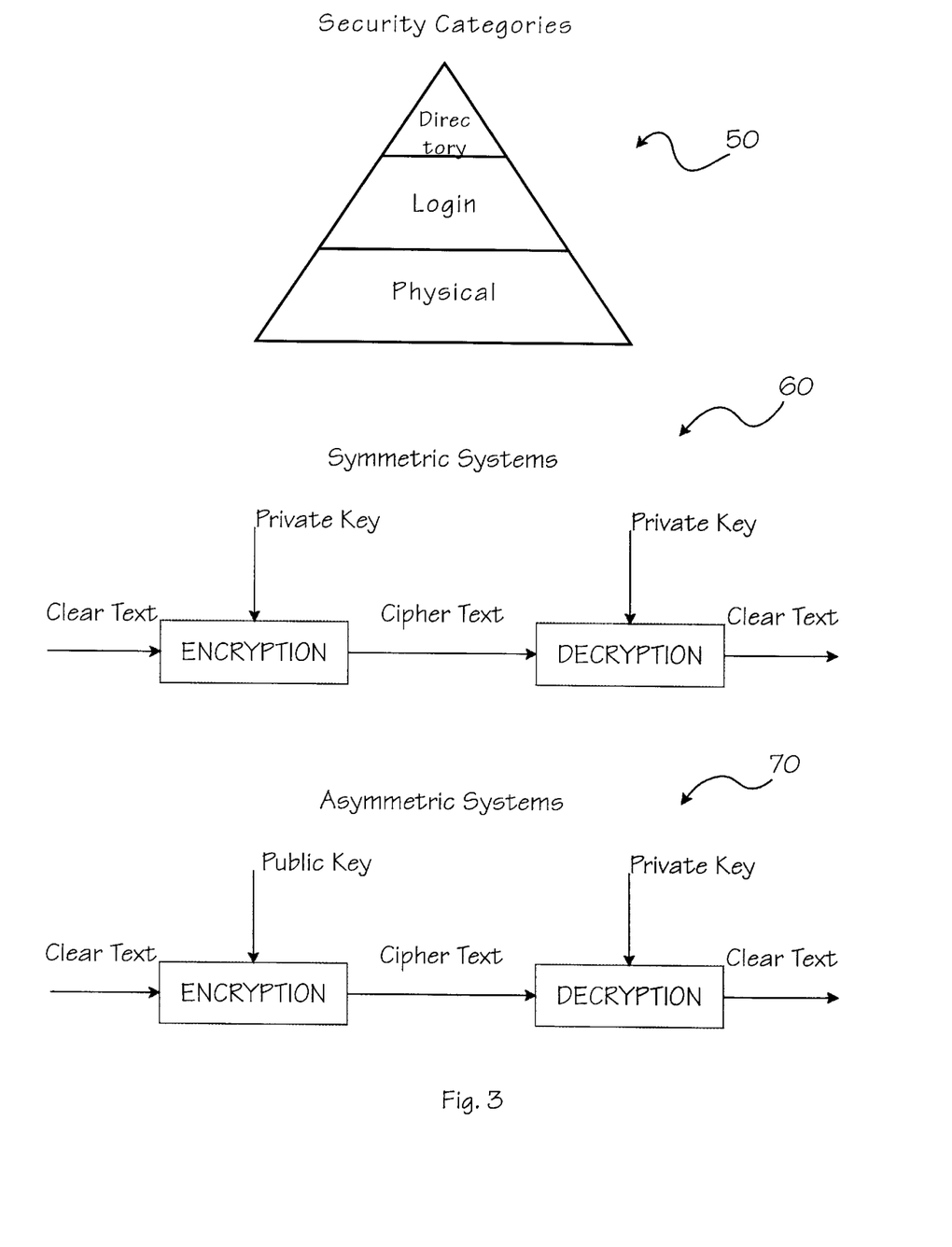
FIG. 3 depicts an access control mechanism and two examples of encryption and decryption systems.

Access to network resources and objects in the distributed directory can be regulated to preserve security. This is particularly desirable as networks become larger and hold more important information. The access control mechanism 50 represented in FIG. 3 illustrates three examples of directory security: physical security, login security, and directory security. Each of these examples of security regulate access to a network and its resources, and can be used independently or in conjunction with one another, or with other forms of security. As the name implies, physical security refers to limiting physical access to a given network resource. For instance, servers in a client/server network are often maintained in a locked room with limited access. As a further example of physical security, a file server console or a workstation can be locked requiring a password or key to access or utilize the server or workstation, respectively.

Login security can vary greatly from one computer system to the next. One form of login security comprises a login phase and an authentication phase. The login phase typically involves prompting a source (such as a user, a program, a resource, etc.) which is attempting to enter the system for a name and a password. After successfully proving knowledge of the password, the source receives an encrypted private key from a server. Next, a credential is used in conjunction with the private key to generate a signature. In the authentication phase, the public key of the server is read by the source. The signature and credential generated during the login phase is used to create a proof which is sent to the server. The proof is verified by the server through a computation using the source's public key stored in the source's object. If the proof is correct, then authentication is successful and the source is allowed access to the system. After successfully completing the authentication phase, the source has "logged in" the system and is represented by an object identity on the distributed directory. The login phase is typically performed only once. However, if, for example, a connection needs to be made to other network servers, the authentication phase can be repeated through a process known as background authentication. This involves subsequent verification by servers using the proof and the public key without additional intervention by the source.

Directory security is usually used in conjunction with login security, where directory security is not used unless login security has been first verified. While directory security can vary greatly, it generally comprises two parts: file system security and object security. File system security provides access control to files and directories, and basically involves assigning trustee rights and file/directory attributes. Trustee rights assignments can be granted to any object in the distributed directory including container objects, user objects, group objects, and organization roles. Examples of such rights include access control, supervisor, read, write, create, erase, modify, and file scan. In contrast, file/directory attributes control what actions can or cannot be taken on a file or directory. For example, certain files could be flagged as "read only" and "shareable" to prevent any unintentional or intentional deletions of such files or directories.

On the other hand, object security provides access control to directory objects and associated operations. Object security generally includes object rights, property rights, and access control lists ("ACLs"). Object rights are granted to a particular object to access or manage another object. Examples of such rights include supervisor, browse, create, delete, and rename. In contrast, property rights enable a trustee to view or change the values of a particular object's properties. A trustee could have rights to certain properties or to all properties of a particular object. For example, the supervisor property right over an object grants supervisor privileges for all properties in that object. All other rights assignments made at the object level, however, are not affected by the property rights. In fact, supervisor rights at the property level do not grant supervisor rights at the object level. Only the reverse is true. The ACL is a special property of every object, which contains trustee assignments for an object and its properties. Typically, an ACL is a tabulated property containing three entries: the trustee ID, the type of access (i.e. object or property), and the actual rights assignment. A user object, for example, with the write right to the ACL of another user object has what is known as "managed rights" over the user object. This means that an object with the write right of an object ACL can make any rights assignments to that object.

FIG. 3 also illustrates two examples of encryption and decryption systems 60, 70. These systems 60, 70 scramble "clear text" (e.g. a textual message, a document, object code, pseudo code, scripts, a secret code, etc.) into "cipher text" which is unusable, unrecognizable, and is very difficult to transform back into the original clear text without the use of a secret key. The secret key is analogous to a physical key that is used to lock a pad lock: to decrypt the cipher text, the corresponding secret key must be used. The symmetric system 60 uses the same private key for both encryption and decryption. Clear text and a private key are entered into an encryption system, which transforms the clear text into cipher text. If the same private key is introduced with the cipher text to a decryption system, the identical clear text will result. Preferably, the symmetric keys are changed often to preserve security. Some suitable symmetric systems are RC2, RC4, and the Data Encryption Standard ("DES").

The asymmetric system 70 uses two different keys: a public key and a private key. The private key is kept private by the owner of the private/public key pair and the public key is distributed or published to anyone who requests it (often by means of a certificate). The public key is used to encrypt clear text into cipher text, and the private key is used to decrypt the cipher text back into clear text. The asymmetric systems tend to be significantly slower than the symmetric systems. One suitable asymmetric systems is the RSA Public-Key Cipher.

Securing Executable Content in a Distributed Directory

Using the present invention, programs can be stored and transmitted in a distributed directory, and utilize the powerful and flexible security mechanisms provided with the distributed directory. Consider the flow chart depicted in FIG. 4. In step 81, after satisfying the applicable access requirements a distributed directory is accessed. The distributed directory has a hierarchy of objects with associated attributes. The distributed directory also has an access control mechanism, such as physical, login and/or directory security, for controlling access to at least a portion of the distributed directory. In step 82, a target object having a target attribute is identified in the distributed directory. The target object can be derived from a standard object class within the schema or the target object can be a customized object. Continuing to step 83, a program, such as a script, pseudo code or object code, is accessed. In the case of script or pseudo code, an interpreter to execute the program may optionally be accessed as well.

Figure 4:
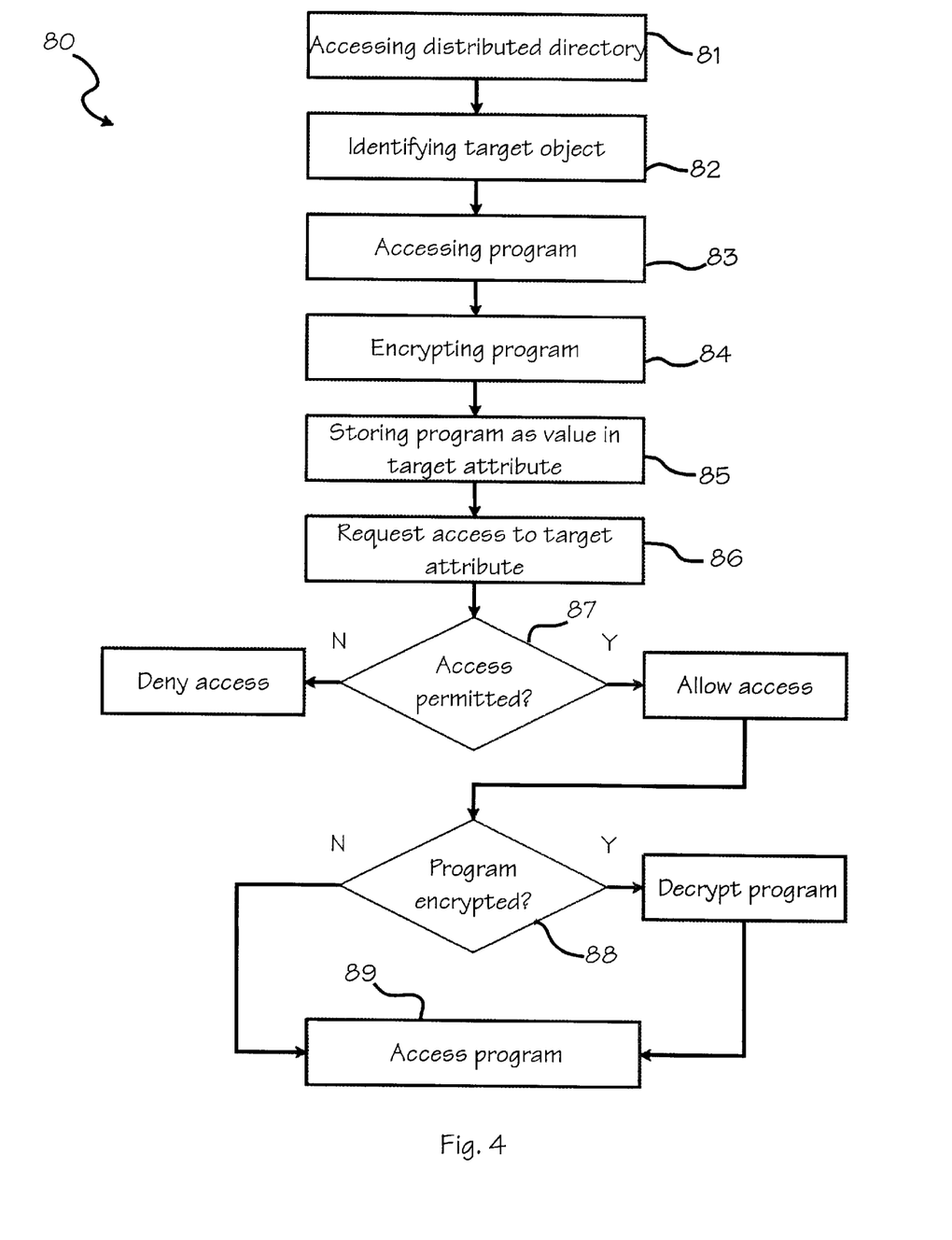
FIG. 4 depicts a flow chart demonstrating one aspect of the invention.

A further level of security can be achieved in optional step 84, wherein the program is encrypted using an encryption system. At step 85, the program is stored as a value in the target attribute of the target object. If the program was encrypted, this cipher text form of the program should be stored. Once stored as a value, the replication system of the distributed directory can then replicate the value to one or more nodes that access the directory. Furthermore, the access control mechanism of the distributed directory will prevent access to the value, whereby the program cannot be executed unless access has been permitted by the access control mechanism.

In steps 86 and 87, when a request to access the program, such as through a request to access either the target object or the target attribute, the access control mechanism determines whether the requester has suitable access rights. If the requestor does not have suitable access rights, access will be denied. Optionally, a notice could be sent to the system administrator or the custodian of the target object than an unauthorized attempt to access the program occurred. If access is permitted, the flowchart continues to step 88 where, if the program was encrypted, the program will then be decrypted using a decryption system. To decrypt the value, the requester must present the appropriate decryption key. In step 89, the requestor is allowed access to the program itself. The actual execution of the program could be achieved automatically (i.e., the request to access the program itself is a request to run the program) or it could be manually activated. For instance, when a detailed window representing the target object is displayed on the screen, a special execution procedure, such as a menu item or a button, could be used to selectively initialize the execution of the program.

Figure 5:
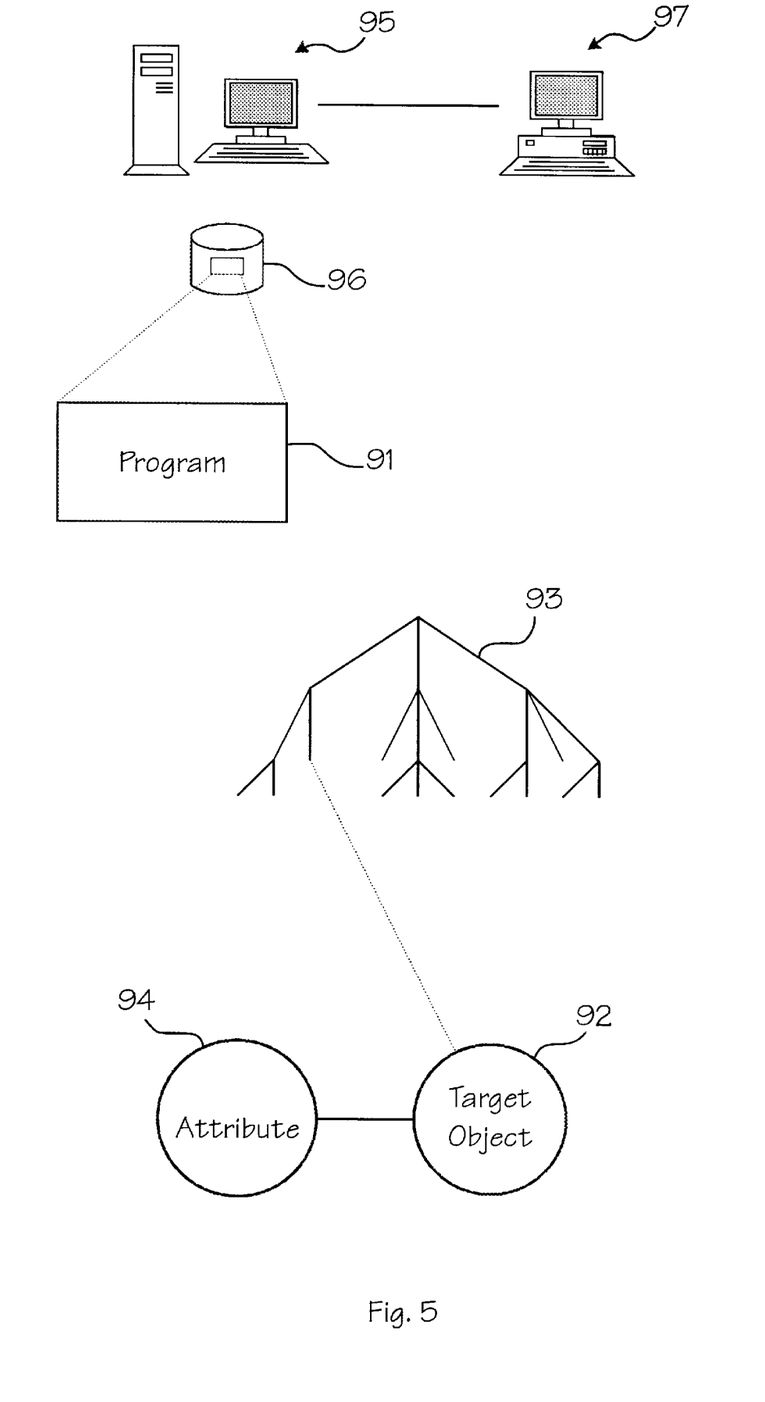
FIG. 5 depicts a system embodying the present invention.

FIG. 5 illustrates a computer system embodying the present invention. The program 91 comprises a sequence of instructions, such as a script, pseudo code or object code, which can be executed. In the case of a script or pseudo code, an interpreter may be required to execute the program 91. The target object 92 is part of the hierarchy of objects in the distributed directory 93 being accessed by a plurality of interconnected nodes. The target object 92 can represent the program 91 itself, or some other thing to which the program 91 may or may not have an association. The target object 92 has a target attribute 94. The target attribute may be one of many associated attributes of the target object 92.

Preferably, the target attribute 94 is a stream attribute type. The stream type syntax represents arbitrary binary information constituting a file of information. Data stored in a stream file has no syntax enforcement of any kind. It is purely arbitrary data, defined by the application that created and uses it. An attribute defined with this syntax is single valued. When a stream is attempted to be read or searched, its value behaves like an empty string, e.g., the return from a read or search returns an empty octet string. Likewise, when you try to add a value the request is ignored. As a stream value, the program 91 is actually a file in the nonvolatile computer readable medium 96 accessed by a computer, such as the file server 95 in a computer network. Preferably, the program 91 is kept in a place on the medium 96 only known to the distributed directory 93. This can be achieved by not entering the program 91 file into the file allocation table (FAT) of the medium 96. The FAT is an index that references files to the cluster addresses on the non-volatile computer readable medium 96, shown here as a hard disk drive. Ordinarily, when a file is requested from a nonvolatile medium, the operating system checks the addresses in the FAT to find out where the file's clusters are stored and then goes to the medium to get the cluster of information. However, in this case, only the distributed directory 93 knows the location of the program 91 on the computer readable medium 96 so it is not known to the server 95 nor is it exposed to anyone else. As such, the program 91 is very secure on the file level.

The access control mechanism of the distributed directory 93 enforces access to the target object 92 and the value stored in the target attribute 94. As such, access to the program 91 is controlled by the flexible and powerful access control mechanism built into the distributed directory 93. As an optional embodiment, an interpreter capable of translating the program 91 into a functional form (if the program 91 is a script or pseudo code) can be stored in the file system of the computer network so it is readily accessible to anybody, or alternatively stored in a second target attribute (not shown) associated with the target object 92 the access of which will also be controlled through the access control mechanism. As a value associated with the target object 92, the program can then be transmitted to a variety of nodes in the network through the replication system of the distributed directory. As a further level of security, the program 91 can be encrypted before it is stored as a value in the target object 92, thus requiring knowledge of a secret key to access the program 91.

The present invention can be used to secure executable content. Consider the present invention being used in a remote access environment. Outside parties often can access a distributed directory through a call-in service or through the Internet. Unless the caller satisfies the authentication requirements from the security system, the caller will generally be granted the limited access rights of an anonymous user. If, however, the caller is properly authenticated, the caller could access executable content stored as a value in an object. As such, executable content is conveniently available through remote access, and at the same time the executable content remains secure from hackers or other intruders.

Security aside, the present invention can additionally enhance the functionality and utility of the distributed directory. Instead of being passive storehouse for information, albeit a secure and robust storehouse, the present invention could transform the distributed directory into a flexible and powerful object oriented system. Using the present invention, objects within the distributed directory will have properties, methods and events. Properties refer to the data stored as values in the object attributes. Methods refer to predefined actions that can be requested for the object to perform. These actions would be the executable content stored as a value with the object. Events refer to an object being able to receive a signal that an event has occurred, which could then trigger an appropriate method. Breaking from the paradigm of separating data from the program, the present invention would integrate the data and the implementation into the same object. In this object oriented framework, the distributed directory could become a self sustaining management utility. Taking the present invention as step further, other object oriented qualities such as polymorphism, inheritance and encapsulation could be added to provide even more flexibility and power to the distributed directory.

Consider the following example. An Auditor object is created in the distributed directory. This object contains a series of rules, such as to monitor access to a known resource. Every time this resource is accessed, the Auditor object will be notified of this event. The event source is described via a program, such as a script, pseudo code or object code, that the distributed directory engine understands. When something happens to the resource being audited, the distributed directory will retrieve the appropriate methods from Auditor object to perform the desired action. That action could be the end to the process, or the object method could invoke yet another object's method to perform other tasks, such as recording the event, and so on.

The foregoing description of the preferred embodiment of the invention has been presented for purposes of illustration and description. It is not intended to be exhaustive nor to limit the invention to the precise form disclosed. Many alternatives, modifications, and variations will be apparent to those skilled in the art in light of the above teaching. For instance, the invention has been illustrated in the context of networked computers, however, the invention can be used with any interconnect nodes. Likewise, the invention has utility in systems other than NDS and NetWare, including, for example, Windows NT, Windows 95, OS/2, Macintosh, Vines, Unix, etc. Accordingly, this invention is intended to embrace all such alternatives, modifications, and variations that fall within the spirit and broad scope of the impended claims.

I claim:

1. A system, comprising:
   a) a plurality of interconnected nodes;
   b) a distributed directory being accessed by the plurality of nodes;
   c) a hierarchy of objects in the distributed directory, one or more of said objects having one or more associated attributes;
   d) an access control mechanism operative to control access to the distributed directory;

e) a target object having a target attribute, wherein access to said target object is controlled by the access control mechanism; and f) a program being stored as a value in said target attribute, wherein access to said program is controlled by the access control mechanism.

2. A system as recited in claim 1, further comprising an interpreter capable of translating the program into a functional form.

3. A system as recited in claim 2, wherein the program is pseudo code.

4. A system as recited in claim 1, wherein the program is object code.

5. A system as recited in claim 1, wherein the value is a stream.

6. A system as recited in claim 1, wherein the access control mechanism comprises login security or directory security.

7. A system as recited in claim 1, wherein the program is stored as a file in a nonvolatile computer readable medium, said file not being registered in the index of the nonvolatile computer readable medium.

8. A system as recited in claim 1, further comprising a replication system capable of replicating the value from one node to at least one other node.

9. A system as recited in claim 1, further comprising an encryption system and a decryption system for encrypting and decrypting the program, respectively.

10. A system as recited in claim 1, wherein the program is a method for the target object.

11. A system as recited in claim 10, wherein the method is triggered by an event.

12. A method for storing a program in a computer system, comprising the steps of:

a) accessing a distributed directory having a hierarchy of objects, one or more of said objects having associated attributes, said distributed directory having an access control mechanism for controlling access to at least a portion of the distributed directory;

b) identifying a target object in the distributed directory, said target object having a target attribute;

c) accessing a program;

d) storing the program as a value in the target attribute; and e) preventing access to the value through the access control mechanism, whereby the program cannot be executed unless access has been permitted by the access control mechanism.

13. A method as recited in claim 12, wherein the program requires an interpreter to be executed.

14. A method as recited in claim 13, wherein the program is pseudo code.

15. A method as recited in claim 12, wherein the program is object code.

16. A method as recited in claim 12, wherein the step of storing involves entering the program as a stream.

17. A method as recited in claim 12, further comprising the step of replicating the value to one or more computers accessing the directory.

18. A method as recited in claim 12, further comprising the step of encrypting the program before the step of storing.

19. A method as recited in claim 12, wherein the program is a method which is executed upon the occurrence of an event.

20. A computer readable medium, comprising a sequence of at least partially compiled instructions stored as a value in a target attribute, said target attribute being associated with a target object in a distributed directory having a hierarchy of objects with associated attributes, wherein access to the value is controlled by an access control mechanism adapted to control access to at least a portion of the distributed directory.

21. A computer readable medium as recited in claim 20, wherein the sequence of instructions is pseudo code or object code.

22. A computer readable medium as recited in claim 20, wherein the value is a stream.

23. A computer readable medium as recited in claim 20, wherein the computer readable medium is nonvolatile.

* * * * *